United States Patent [19]

Porri

[11] Patent Number: 5,302,300

[45] Date of Patent: Apr. 12, 1994

[54] METHOD AND APPARATUS FOR SEPARATING WATER FROM A CONDENSATE MIXTURE IN A COMPRESSED AIR SYSTEM

[75] Inventor: Richard E. Porri, Charlotte, N.C.

[73] Assignee: Ingersoll-Rand Company, Woodcliff Lake, N.J.

[21] Appl. No.: 42,958

[22] Filed: Apr. 5, 1993

[51] Int. Cl.[5] .............................................. B01D 5/00
[52] U.S. Cl. ..................... 210/774; 210/177; 210/180; 210/181; 210/188; 95/40; 95/187; 95/188; 95/288
[58] Field of Search ............... 210/175, 774, 176, 177, 210/180, 181, 188; 55/189, 195, 267, 196, 208, 222, 223, 257.7, 264, 265, 338, 418, 423, DIG. 17; 95/39, 40, 178, 179, 187, 188, 209, 288

[56] References Cited

U.S. PATENT DOCUMENTS

| | | | |
|---|---|---|---|
| 1,213,795 | 1/1917 | Felt | 95/40 |
| 1,237,767 | 8/1917 | Felt | 95/40 |
| 3,864,102 | 2/1975 | Powers | 95/39 |
| 4,876,015 | 10/1989 | McKibben | 210/180 |
| 5,132,011 | 7/1992 | Ferris | 55/175 |
| 5,151,176 | 9/1992 | Strid et al. | 210/187 |

Primary Examiner—Robert A. Dawson
Assistant Examiner—W. L. Walker
Attorney, Agent, or Firm—Victor M. Genoc, Jr.

[57] ABSTRACT

An apparatus removes water from a liquid mixture which has formed in a compressed gas system. The apparatus includes a gas compressor having an inlet port for receiving low pressure gas to be compressed and a discharge port through which a stream of compressed gas flows. An aftercooler is disposed in fluid communication with the discharge port for cooling the compressed gas stream. A vessel collects any entrained liquid water and lubricant from the compressed gas stream. The vessel has a sump portion and a vent to an atmosphere external to the compressed air system. A heat exchanger heats the liquid mixture within the vessel to a predetermined temperature to vaporize the water. The water vapor exits the vessel through the vent and the lubricant remains in the sump portion of the vessel. A valve permits the separated lubricant to be drained from the sump portion of the vessel to a location external to the compressed air system.

6 Claims, 1 Drawing Sheet

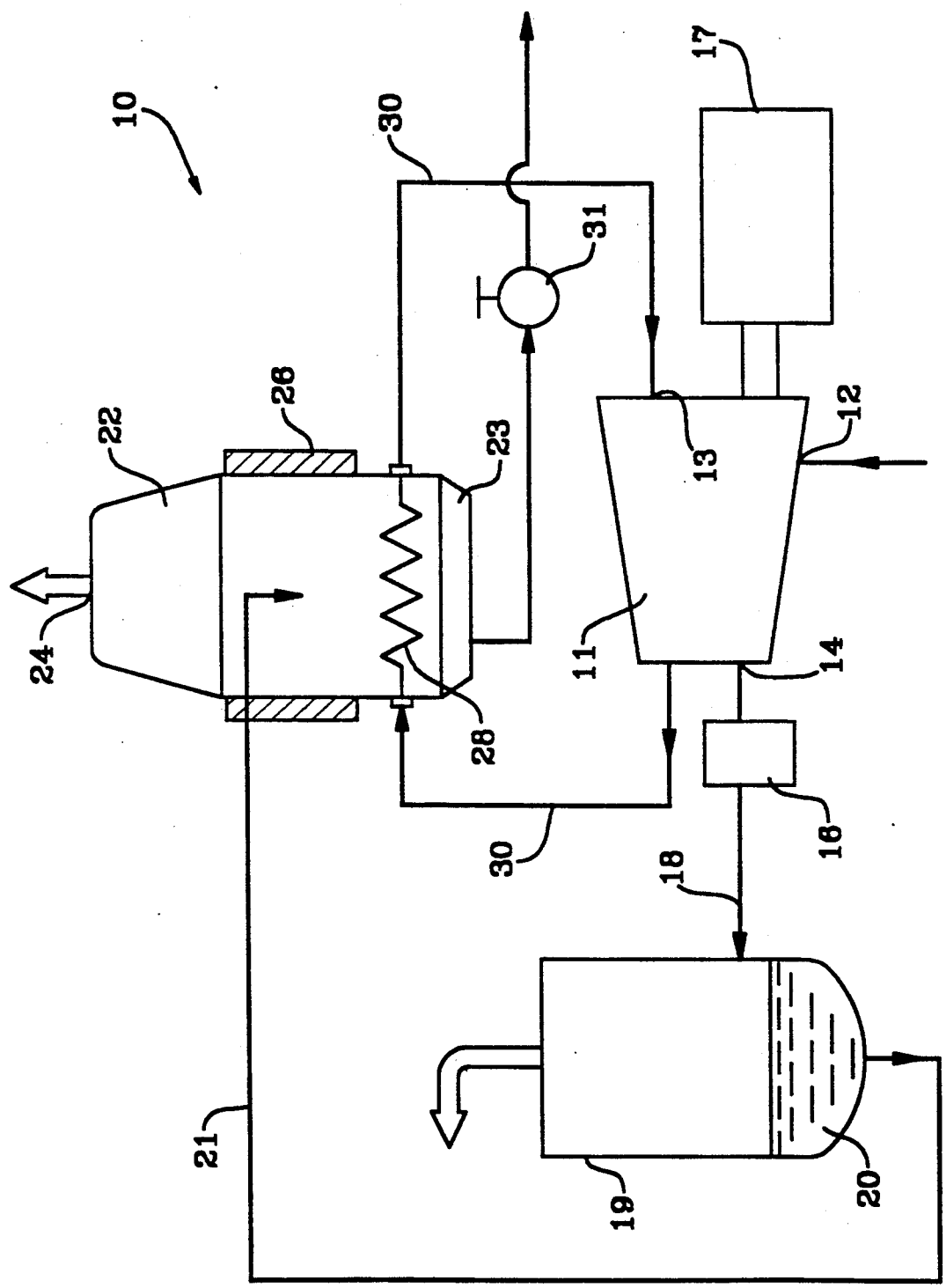

METHOD AND APPARATUS FOR SEPARATING WATER FROM A CONDENSATE MIXTURE IN A COMPRESSED AIR SYSTEM

BACKGROUND OF THE INVENTION

This invention generally relates to compressed air systems, and more particularly to a method and apparatus for separating water condensate from a water/oil condensate mixture collected during operation of a compressed air system.

Atmospheric air is used as an air source for most compressed air systems. All atmospheric air contains some amount of water vapor which will begin to condense into liquid water in the compressed airstream when the compressed air cools to a predetermined temperature.

During the compression of air, heat is generated. To overcome the detrimental effects of the heat, and to lubricate various compressor elements, lubricating oil is introduced into the compressor at predetermined locations. Downstream of the compressor, a heat exchanger, such as an aftercooler, is typically employed to cool the compressed air, which thereby condenses any water or lubricant vapors present within the compressed airstream.

It has long been recognized that it is desirable to "dry" compressed air before its use by an object of interest. In this regard, typically moisture separators, air dryers, and filter assemblies are employed in the compressed air system to remove any entrained liquid water and oil droplets from the compressed airstream. The liquid water and oil which are removed from the compressed airstream typically are collected at predetermined desired locations within the compressed air system, such as in a moisture separator tank, for example, or at various other locations in the compressed air system, such as in the aftercooler, for example. This condensate mixture (effluent condensate) is typically not re-usable by the compressed air system. Accordingly, to date the effluent condensate has been removed from a respective compressed air system for hazardous waste disposal.

As should be understood, the costs associated with the disposal of a predetermined volume of liquid hazardous waste are extreme, and these costs are increasing. Presently, the volumes of effluent condensate which are removed from compressed air systems are primarily composed of non-toxic water. Accordingly, the costs associated with the hazardous waste disposal of effluent condensate may be significantly reduced by removing the water present therein, to thereby reduce the total volume of effluent condensate to be disposed. Present compressed air systems do not provide for a simple and efficient means for removing the water from a volume of effluent condensate to thereby reduce the total volume of effluent condensate to be disposed.

The foregoing illustrates limitations known to exist in present compressed air systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus for separating water from a liquid effluent mixture which has formed in a compressed air system during the operation of a compressor. The apparatus includes a vessel for receiving the liquid effluent mixture. The vessel has a sump portion and a vent to an atmosphere external to the compressed air system. A means for vaporizing the water heats the liquid effluent mixture to a predetermined water vaporizing temperature. In its vapor state, the water exits the vessel through the vent. Liquid effluent remains in the sump portion of the vessel. A valve means is provided for draining the remaining liquid effluent from the sump portion of the vessel to a location external to the compressed air system.

The foregoing and other aspects will become apparent from the following detailed description of the invention when considered in conjunction with the accompanying drawing figure.

BRIEF DESCRIPTION OF THE FIGURE

The FIGURE is a schematic view showing an apparatus for separating water from a liquid mixture in accordance with the present invention.

DETAILED DESCRIPTION

The FIGURE illustrates generally at 10 the apparatus for separating water from a condensate mixture in accordance with the present invention. The apparatus includes a gas compressor 11 which may be an oil flooded compressor, such as an oil flooded rotary screw compressor or an oil-flooded reciprocating compressor, for example. The compressor 11 may also be an oil free type compressor, such as a centrifugal compressor or an oil free rotary screw compressor which uses a lubricant to cool and lubricate the compressor. As used herein, the term compressor is defined as any type of oil-free or oil-injected rotary, reciprocating, or centrifugal pump for raising the pressure of a gas, such as air.

The compressor 11 includes a compression chamber (not shown), an inlet port 12 for supplying air at low pressure to be compressed, an inlet 13 for supplying a lubricant, such as oil, to the compressor 11 to cool and lubricate the compressor, and a discharge port 14 through which a stream of compressed gas flows. As should be understood, the compressed gas stream or airstream contains water vapor and lubricant, such as oil, for example.

An intake regulator (not shown) may be flow connected to the compressor inlet port 12. Additionally, an inlet filter (not shown) may be flow connected to the intake regulator to prevent foreign particles from entering the compression chamber. The compressor 11 is suitably driven by a conventional prime mover, such as a drive motor 17, which may be an electrical motor or diesel engine, for example.

An aftercooler 16 is flow connected in compressed fluid receiving relation to the discharge port 14. The aftercooler 16 is a conventional heat exchanger which is operable to cool the compressed air discharged from the discharge port 14, which thereby condenses any water or other vapors present within the compressed airstream. The aftercooler 16 is flow connected in compressed fluid supplying relation to a separating means or moisture separator 19, by way of a conduit or pipe 18.

The moisture separator 19 is flow connected in compressed air supplying relation to a service valve (not shown) for use by an object of interest. The moisture separator 19 is operable to remove entrained effluent condensate from the compressed airstream. The effluent condensate collects in a moisture separator sump portion 20. Effluent condensate also collects at other various locations in the apparatus 10, such as in compressed air receivers (not shown) and drip legs (not shown). However, wherever effluent condensate collects in the compressed air system, the effluent condensate is piped, via a conduit 21, to a condensate collection vessel 22.

In the preferred embodiment, the vessel 22 has a sump portion 23 and a vent 24 to an atmosphere external to the compressed air system. As described hereinabove, the vessel 22 is disposed in fluid receiving relation to the sources of effluent condensate, such as the moisture separator 19, the receiver (not shown) and the drip legs (not shown), by the pipe or conduit 21. The effluent condensate received by the vessel 22 collects in the vessel sump portion 23. The vessel 22 may be insulated by suitable insulation 26 to increase the efficiency of the apparatus 10.

A means for vaporizing the water, such as a heat exchanger 28, is disposed in heat transmitting relation with the effluent condensate contained within the vessel 22. The heat exchanger 28 is disposed in fluid receiving relation to a hot fluid, such as a hot oil, from the compressor 11. The hot oil continuously circulates within a fluid path 30 which is disposed in heat exchanging relation with the compressor and the vessel. The fluid path 30 extends from the compressor 11, through the vessel 22, and back to the compressor 11.

A valve 31 is flow connected to the vessel 22 for draining the remaining effluent from the vessel to a location external to the compressed air system.

In operation, low pressure ambient air enters the compressor 11 by way of the inlet port 12. During operation of the compressor, oil is introduced therein to cool the compressor to control the compression temperature within a predetermined temperature range, and to lubricate predetermined compressor elements. Flowing out of the discharge port 14 is a stream of compressed air which contains water vapor and other vapors. The aftercooler 16 condenses the vapors. The moisture separator 19 separates any entrained liquid water and oil from the compressed airstream. The "dry" compressed gas exits the moisture separator to further storage for later use or is directly used by an object of interest.

The effluent condensate which has been collected in the moisture separator 19, the air receivers (not shown), the drip legs, and which has been collected at any other compressor locations is carried to the vessel 22 via the conduit 21. In the vessel, the effluent condensate is heated by the heat exchanger 28 to a predetermined temperature to vaporize the water in the effluent condensate, after which the water vapor exits the vessel 22 through the vent 24. The predetermined temperature is below the temperature at which the oil vaporizes. The remaining effluent condensate is drained from the vessel, such as by action of the valve 31, for hazardous waste disposal.

While this invention has been illustrated and described in accordance with a preferred embodiment, it is recognized that variations and changes may be made therein without departing from the invention as set forth in the following claims.

Having described the invention, what is claimed is:

1. An apparatus for removing water from a condensate mixture which has formed in a compressed gas system, the condensate mixture containing both a lubricant and water, the apparatus comprising:

an oil flooded gas compressor having an inlet port for receiving low pressure gas to be compressed and a discharge port through which a stream of compressed gas flows;

an aftercooler disposed in fluid communication with the discharge port;

a vessel for collecting, as an effluent condensate mixture, any entrained liquid water and lubricant from the compressed gas stream, the vessel having a sump portion and a vent to an atmosphere external to the compressed air system, the vessel being disposed in fluid receiving relation with the aftercooler;

means for vaporizing the water, the vaporizing means heating the effluent condensate mixture to a predetermined temperature to thereby vaporize the water, at which time, the water vapor exits the vessel through the vent, whereby the lubricant remains in the sump portion of the vessel; and valve means for draining the separated lubricant from the sump portion of the vessel to a location external to the compressed air system.

2. The apparatus according to claim 1, and wherein the vaporizing means is disposed within the vessel, the vaporizing means heating the effluent condensate mixture with a hot fluid from the compressor to a temperature which is below a temperature at which the lubricant vaporizes.

3. The apparatus according to claim 2, and wherein the hot fluid continuously circulates within a fluid path which is disposed in heat exchanging relation with the compressor and the vessel, the fluid path extending from the compressor, through the vessel, and back to the compressor.

4. The apparatus according to claim 3, and wherein the hot fluid is a lubricant oil.

5. A method for separating water from a liquid mixture which has formed in a compressed gas system during operation of a gas compressor, the compressor having an inlet port for receiving low pressure gas to be compressed and a discharge port through which a stream of compressed gas flows, the stream of compressed gas containing water vapor and other predetermined vapors, the method comprising the steps of:

condensing the vapors in the compressed gas stream;

separating any entrained liquid water and oil from the compressed gas stream;

collecting, in a vessel and as a mixture, the liquid water and oil;

heating the liquid water and oil mixture to a predetermined temperature to vaporize the water, the predetermined temperature being below a temperature at which the lubricant vaporizes;

venting the water vapor from the vessel to an atmosphere external to the compressed gas system; and draining the separated oil from the vessel to a location remote to the compressed gas system.

6. The method according to claim 5 further comprising the step of:

heating the liquid water and oil mixture to the predetermined temperature with a hot fluid from the compressor, the hot fluid continuously circulating in a fluid path from the compressor, through the vessel, and back to the compressor.

* * * * *